Patented July 29, 1952

2,605,280

UNITED STATES PATENT OFFICE 2,605,280 p-AMINOBENZENEPHOSPHONOUS ACID

Irving M. Klotz and Robert T. Morrison, Evanston, Ill., assignors to the United States of America as represented by the Secretary of the Navy No Drawing. Application January 13, 1948, Serial No. 2,137

1 Claim. (Cl. 260—500)

This invention relates to p-aminobenzenephosphonous acid which has an antibacterial action similar in nature to that of the sulfonamides.

An important object of the invention is in the provision of a new antibacterial compound which has a marked growth-inhibiting effect on bacteria and has chemotherapeutic properties similar to the sulfa drugs, but containing no sulfur.

Proceeding upon the assumption that the strength of the sulphonamide-enzyme complex is increased with decreasing acidity, this new compound has been prepared by the amination of p-bromobenzene phosphonous or p-chlorobenzenephosphonous acid. The new product is slightly less active than sulfanilamide.

In preparing this new compound, bromobenzene or chlorobenzene is refluxed with an excess of phosphorus trichloride in the presence of anhydrous aluminum chloride. The resulting p-halophenyldichlorophosphine,

where X represents Br or Cl, after extraction with petroleum ether and purification by distillation, is then hydrolyzed by warm water to yield the corresponding phosphonous acid

For bromo-benzene this may be represented by the following:

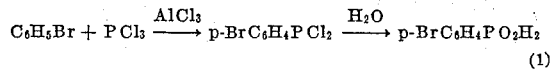

Amination of (1), p-bromobenzenephosphonous acid is carried out in the following manner: 17.7 grams (0.08 mole) of p-bromobenzenephosphonous acid, 11.4 grams (0.08 mole) of freshly precipitated cuprous oxide, and 350 ml. of concentrated ammonium hydroxide (sp. gr. 0.90) are placed in a stainless steel bomb of 400 cc. capacity. The bomb is heated while rotating in an inclined position, so that the temperature of the contents is between 55° C. and 65° C. for one hour.

The reaction may be carried out at a temperature as high as 100° C. for as long as two and one-half hours without appreciably affecting the yield of p-aminobenzenephosphonous acid. Temperatures lower than 55° C., however, result in lower yields.

The reaction mixture is removed from the bomb or container, saturated with hydrogen sulfide, and the copper sulfide is removed by filtration. The filtrate is then evaporated to dryness on a steambath under reduced pressure. The solid residue is dissolved in 20 ml. of water, and the solution made strongly acidic (pH less than 2) with hydrochloric acid and filtered from any undissolved material.

When the filtrate is made weakly acidic to congo red by the addition of ammonium hydroxide, p-aminobenzenephosphonous acid precipitates and is collected on a filter; its weight is 6.8 grams, or 54% yield based upon p-bromobenzenephosphonous acid, and its melting point (M. P.) is 163–4° C. Recrystallization from water after decolorizing with charcoal yields a white crystalline solid with these properties: M. P. 169° C.; equivalent weight, calculated 157.1, found 158.0; analysis, calculated phosphorus 19.74%, found phosphorus 19.66%; solubility in water at 0° C., about 5%

This second step, the synthesis of the amino compound, may be represented as follows, taking the end product from (1):

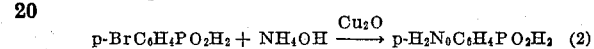

The amination of p-chlorobenzenephosphonous acid is carried out in exactly the same manner, except that the temperature of the bomb must be held at 95° C. to 100° C. for two and one-half hours. The yield of p-aminobenzenephosphonous acid is 40%.

The activity of p-aminobenzenephosphonous acid has been tested against E. coli, Proteus vulgaris, and Proteus pyocyanea, and other organisms, and has been found to have a very marked growth inhibitive effect, slightly less than sulfanilamide. This antibacterial action was antagonized by p-aminobenzoic acid at concentrations approximately equal to those necessary to counteract sulfanilamide.

Thus this compound shows chemotherapeutic properties similar to the sulfa drugs, but it contains no sulfur: it has been found to be practically non-toxic when given orally; mice are able to tolerate over 4.0 grams per kilogram of body weight. Further tests on this and related compounds are in progress.

We claim:
p-Aminobenzenephosphonous acid represented by the formula

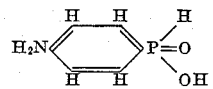

IRVING M. KLOTZ.
ROBERT T. MORRISON.

(References on following page)

REFERENCES CITED

The following references are of record in the file of this patent:

UNITED STATES PATENTS

| Number | Name | Date |
|---|---|---|
| 1,607,113 | Benda | Nov. 16, 1926 |
| 2,137,792 | Woodstock | Nov. 22, 1938 |
| 2,228,653 | Denison | Jan. 14, 1941 |
| 2,346,155 | Denison | Feb. 23, 1942 |

OTHER REFERENCES

Bauer: Chem. Abstracts, vol. 35, 6577–6578 (1941).

Bauer et al.: Chem. Abstracts, vol. 34, p. 818 (1940).

Michaelis: Annalen der Chemie, vol. 293, pp. 193–211.